United States Patent [19]

Guma

[11] Patent Number: 4,727,898
[45] Date of Patent: Mar. 1, 1988

[54] PORTABLE AUTOMATIC COVER

[76] Inventor: Tesfa Guma, 7709 Newcastle Dr., Annandale, Va. 22003

[21] Appl. No.: 9,581

[22] Filed: Jan. 29, 1987

Related U.S. Application Data

[63] Continuation of Ser. No. 715.021, Mar. 22, 1985, abandoned.

[51] Int. Cl.$^4$ ............................................. B60J 7/20
[52] U.S. Cl. ........................................ 135/87; 296/98; 296/136
[58] Field of Search ................ 135/87, 88, 101, 117, 135/903, DIG. 5; 47/17, 21–23, 26, 28, 29; 160/68–70, 72, 73, 78, 22, 45, 48, 49, 52, 54, 59, 60, 56, 66–71; 108/138; 49/229; 296/98, 136109, 143; 293/117; 150/52 K

[56] References Cited

U.S. PATENT DOCUMENTS

| | | | |
|---|---|---|---|
| 595,149 | 12/1897 | Coulson | 47/20 |
| 924,549 | 6/1909 | Haley | 47/28 |
| 1,114,599 | 10/1914 | Frank | 160/56 |
| 1,183,950 | 5/1916 | Carlin | 160/56 |
| 1,416,659 | 5/1922 | Watt et al. | 296/136 X |
| 1,707,110 | 3/1929 | Bracken | 160/71 |
| 2,094,801 | 10/1937 | Mass | 47/20 |
| 2,185,581 | 1/1940 | Bessonneau | 296/136 |
| 2,201,984 | 5/1940 | Clark | 135/88 |
| 2,598,940 | 6/1952 | Robie | 135/88 |
| 2,885,114 | 7/1958 | Edwards | 108/138 |
| 2,912,703 | 11/1959 | Murphy | 135/101 |
| 3,018,783 | 1/1962 | Tyson | 135/903 |
| 4,064,648 | 12/1977 | Cary | 47/17 |
| 4,174,134 | 11/1979 | Mathis | 296/136 |
| 4,432,581 | 2/1984 | Guma | 135/88 |

FOREIGN PATENT DOCUMENTS

| | | | |
|---|---|---|---|
| 912881 | 8/1946 | France | 135/88 |
| 646059 | 9/1962 | Italy | 135/88 |
| 106396 | 5/1917 | United Kingdom | 296/109 |

*Primary Examiner*—James R. Feyrer
*Attorney, Agent, or Firm*—Diller, Ramik & Wight

[57] ABSTRACT

A cover for an object, which automatically extends over the object and retracts into a storage position. The cover has one end attached to a roller which is rotatably attached to the object. A number of adjustable brackets are positioned along the upper and side surfaces of the object. Guide elements are attached to the cover and slidably and interlockably connected to the brackets. When the cover is extended over the object, the adjustable brackets automatically unfold, raising the cover upward and extending the flaps sideways to protect the object. For military purposes, when an air compressor or a liquid pump is actuated, the double layer of the cover and the flaps are filled with air or any liquid of desired temperature, thus, providing instant automatic camouflage and also protective covering against enemy detection and attack by heat seeking missiles.

16 Claims, 7 Drawing Figures

U.S. Patent   Mar. 1, 1988   Sheet 1 of 2   4,727,898
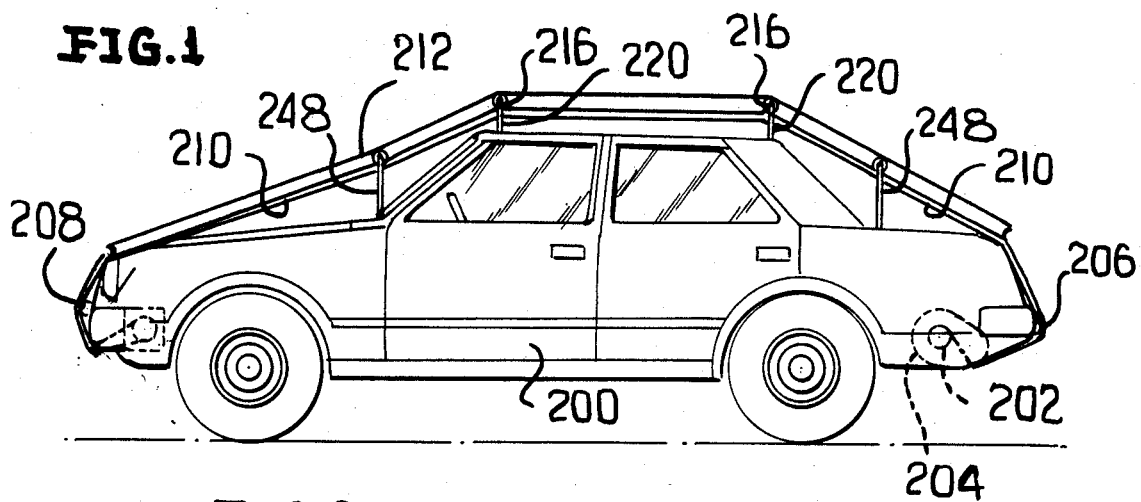
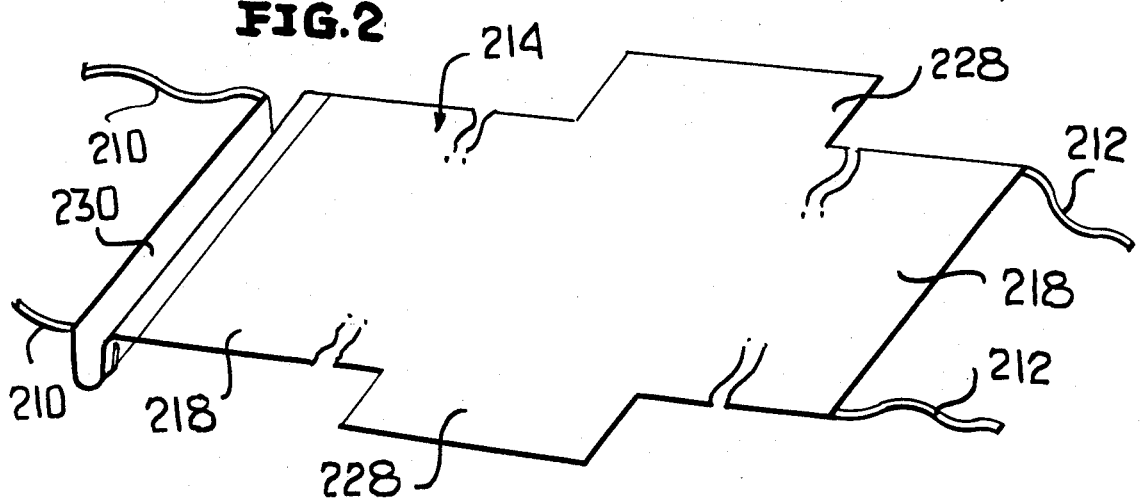
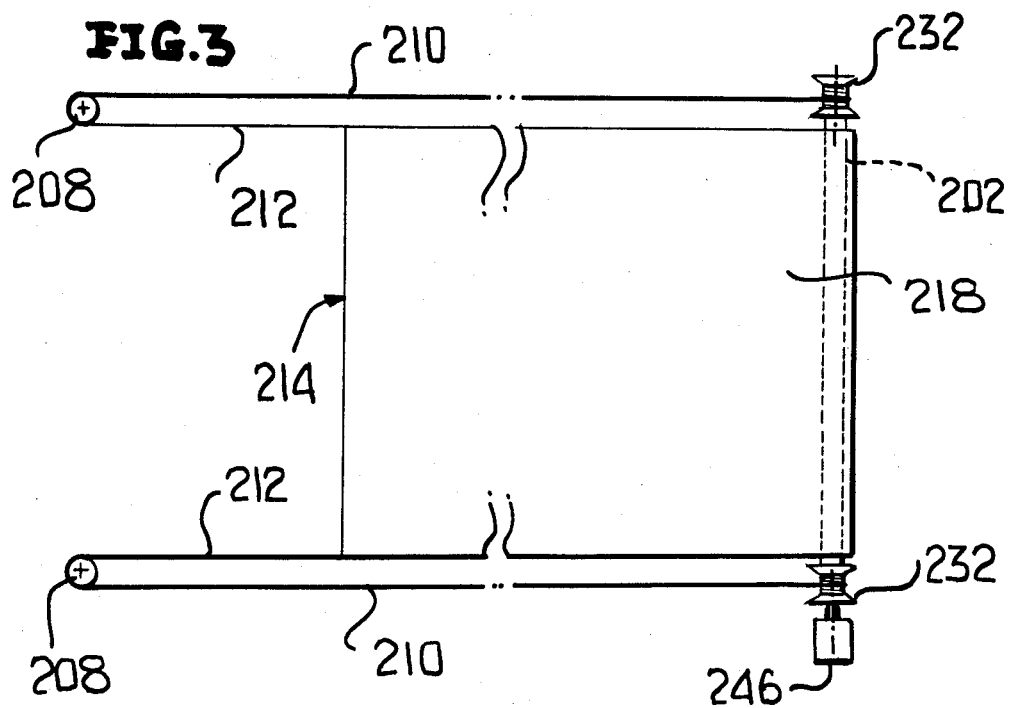

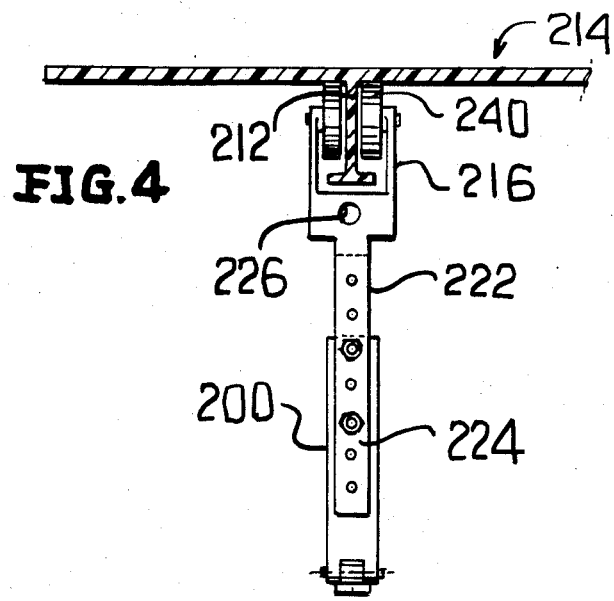
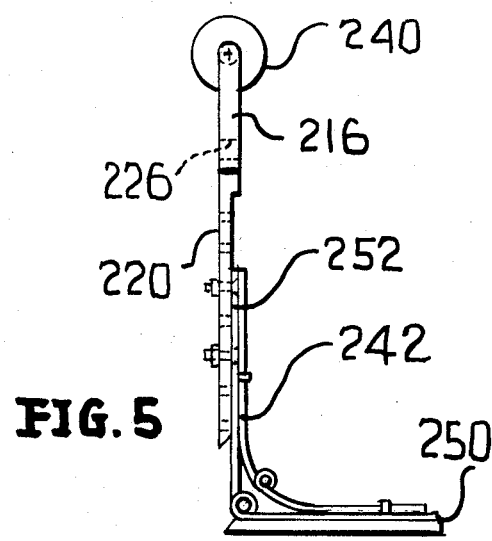
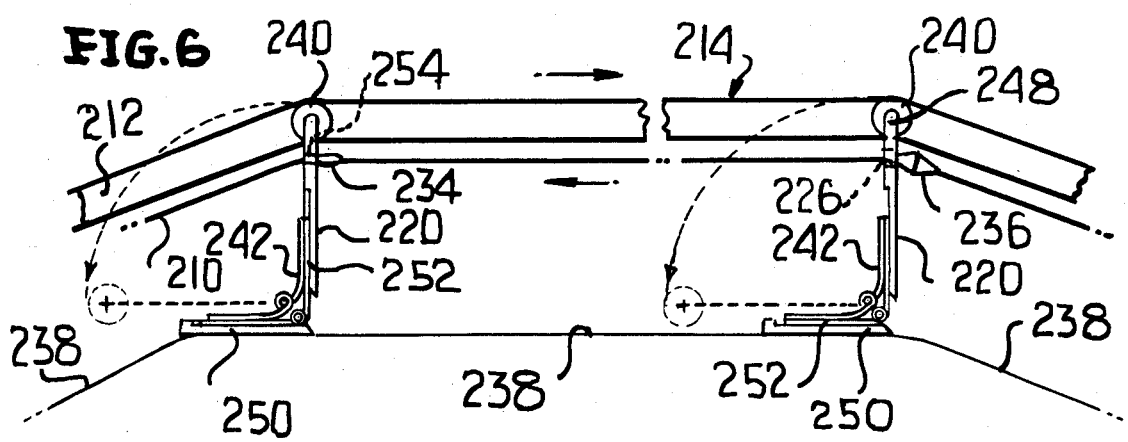
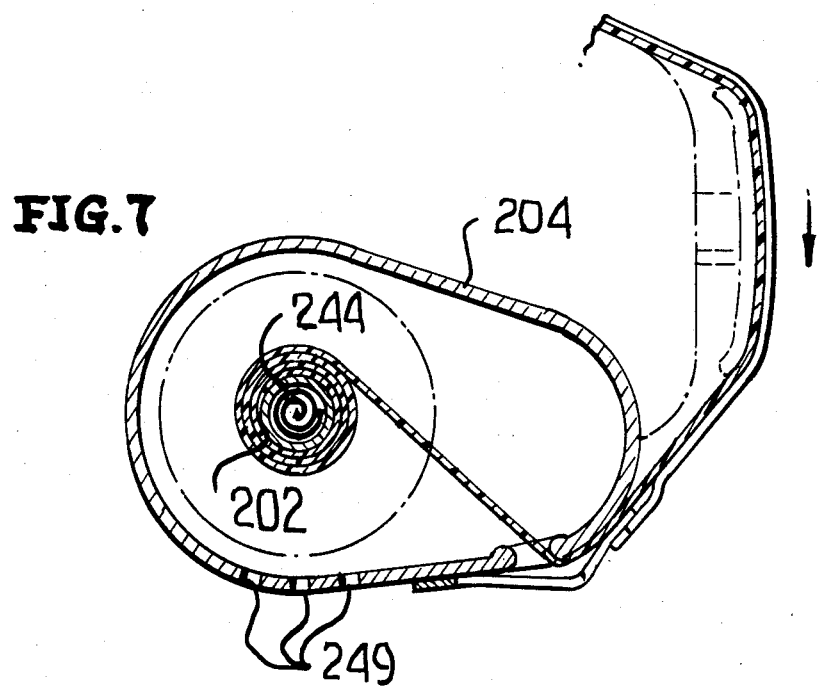

PORTABLE AUTOMATIC COVER

This application is a continuation of application Ser. No. 715,021, filed Mar. 22, 1985, now abandoned.

BACKGROUND OF THE INVENTION

1. Field of the Invention

The present invention relates to covers. More specifically, the present invention relates to those covers which can automatically be extended from a storage position to provide protection for vehicles athletic fields, swimming pools and all surfaces which need protective covering against the elements.

2. Description of the Prior Art

From the earliest days man, in general, has contended with the elements. In summer the sun beating down on vehicles not only degrades the exterior finish of the vehicles but also spoils the interior and the contents. Rain, mud rains and hail dirty the vehicle surface, destroy grains and other crops spread out in the open to dry in the sun; permanently damage nursery plants and vegetable crops; and dirty swimming pools; and flood athletic fields including tennis courts and the like. During the winter, snow and ice cake on the vehicles, and aircrafts rendering them dangerous to operate; damage nurseries and vegetable plants by covering them to freeze, cover athletic fields and swimming pools temporarily putting them out of use. Tree leaves, dust and bird drops are constant threats in dirtying uncovered properties.

The military always have to contend with the problem of providing instant covering and camouflaging means for war vehicles, aircrafts, ships and other military hardware both against the elements and especially against enemy detection and attack. The conventional way, presently in use, is to paint these hardwares with camouflage colors or cover them with local leaves. This method is not only time consuming but also useless against the damaging effects of the elements.

To overcome the problems of protectively covering vehicles, car covers have long been known consisting of fabric or plastic shaped to the form of the particular vehicle. This cover may be stored in trunk of the vehicle in a folded state, and then taken out and spread over the vehicle to provide protection. Although such a cover does protect the vehicle from the elements, a number of drawbacks exist. First, the cover must be manually placed on the vehicle, manually removed and manually folded. Not only is this procedure time consuming, but also difficult for one person to manage, particularly with larger vehicles, aircrafts and ships. Furthermore, in winter, after a snowfall, it is necessary to clear the cover of ice and snow before it can be properly folded and stored.

To overcome these problems, automatically extending and retracting vehicle covers have been developed. Thus, U.S. Pat. No. 4,174,134 to Mathis teaches a cover which is stored on a roller. The leading edge of the cover is attached to conveyor lines. When a motor is operated, the roller turns and the lines moved so as to draw the cover over the passenger compartment of the vehicle.

Several problems exist with the cover assembly disclosed in Mathis. First, the conveyor lines are directed simply by rollers. Thus, a tendency may exist for the conveyor lines to jump off of the rollers, particularly in winter when ice and snow may interfere with smooth operation. Also, although the Mathis cover might protect the upper surfaces of the vehicle, rarely does snow fall absolutely vertically, unaffected by wind. The Mathis cover provides no protection for the sides of the vehicle. Finally, if snow should fall while the cover is extended, it would be necessary to scrape the cover so that the ice and snow is not rolled in with the cover.

U.S. Pat. No. 2,688,513 to Poirier teaches a power operated vehicle cover that solves some of the problems of the Mathis cover, yet creates additional problems. Thus, Poirier teaches the use of flaps to protect sides of a vehicle. However, the flaps must be positioned manually, thus introducing some of the problems of fully manual covers. Also, although the cover extends automatically from a roll in the rear of the vehicle, it appears that no guides are employed to ensure that the cover proceeds properly from the roller. Finally, as with Mathis, if snow should fall while the cover is extended, it would be necessary to scrape the cover prior to retraction to ensure that snow is not rolled with the cover upon retraction.

U.S. Pat. No. 4,432,581 to Guma, while teaching additional and improved functionality of Portable Automatic Carport, needs a number of improvements in some of the embodiments in order to make the device more useful in more areas where automatic protective coverings are necessary.

For example there is no snow and debris retaining means in order to eliminate the sliding off of snow and debris on to uncovered part of the vehicle while the cover means is being retracted into the storage housing. The use of two motors becomes unnecessary when only one reversible motor can accomplish the same function.

As the cover fabric is extended and retracted over the surface of the vehicle it scratches the outer finish and causes damage and deterioration to the vehicle. Whenever the vehicle is subjected to wet condition, it would be necessary to dry the cover fabric prior to retraction into storage housing or provide a means of draining any liquid inside the storage housing.

A number of other U.S. Patents, in addition to the three discussed above also describe vehicle covers. See U.S. Pat. Nos. 3,992,053, 3,222,102, 3,021,894, 1,999,171, 1,918,423, 1,912,231, 1,719,055.

SUMMARY OF THE INVENTION

The present invention overcomes the problems identified above by providing a cover which automatically extends over a vehicle or an object and retracts into a storage position. The cover includes flaps which automatically extend outwardly to the sides of the vehicle or the object to provide protection for the sides.

A plurality of adjustable brackets automatically prevent the cover means from touching the finish of the vhicle while also facilitating proper conveyance of the cover over the surface of the vehicle or the object.

A reversible motor is attached to the roller and the drawing spools for wrapping the cover about the roller, or reversibly extending the cover over the vehicle by driving the drawing spools. Drawing lines attached to the front end of the cover in alignment with the guides loop around the pulleys on the opposite end of the vehicle or the object, pass through the line holes on each bracket, and finally connect to the drawing spools, which are in turn driven by the same reversible motor which drives the roller. Tension control devices are built into the roller and the drawing spools in order to maintain the proper tension in the lines and in the guides.

When the motor is activated to cover the vehicle, the adjustable brackets simultaneously extend the cover and the flaps outwardly and upwardly to protect the sides of the vehicle. When the motor is reversed to retract the cover, the adjustable brackets fold back into their original positions; thus allowing the guides and the flaps to assume foldable positions for final rolling up into the storage housing. Plurality of drainage holes are provided at the bottom of the storage housing to drain any liquid which may enter the housing. Across the leading end of the cover means is attached snow and debris retaining gutter in order to prevent the sliding off of snow or foreign material on to the uncovered part of the vehicle while the cover is being retracted over the roof of the vehicle or the upper area of any object it covers.

The problem of protectively covering threshed grain or drying crops, nursery plants and vegetable crops, swimming pools and athletic fields; and the problem of providing portable automatic camouflage covering for military vehicles, aircrafts, ships, and other military hardwares can all be solved with the same device or a simplified version of portable or stationary automatic vehicle cover.

This arrangement produces numerous advantages. The cover protects the object being covered from direct exposure to the sun's rays. As a result, the cover reduces the uncomfortably hot temperature to which a vehicle's interior typically rises during the summer. In the same regard, energy is conserved by reducing the need for air conditioning. Both the interior and exterior of the vehicle can be protected from the damaging effects of the sun, such as scorching, fading, discoloration and wear, resulting in lower maintenance costs and longer life. The finish is protected from hail, rain and mud rain. In addition to reducing color fading, it also reduces the time, human energy and money normally spent on washing and polishing the vehicles.

For covering other properties such as drying grain, nursery plants and vegetable crops, swimming pools and athletic fields it provides instant makeshift covering against the elements.

For military vehicles and its various hardwares, it facilitates instant camouflage covering anywhere under any condition. Furthermore, the cover can be made of double layers of material sealed together on all sides so as to allow air space between the two layers. This enables the operator to pump cold air into the camouflage cover in order to protect the vehicle or object from being targeted by heat seeking missiles. The automatic makeshift cover eliminates the danger of operating air crafts after they have been parked in the open under icy weather. Thus, with the present invention, a vehicle or an object may be covered and uncovered fast, effortlessly, with a push of a button.

BRIEF DESCRIPTION OF THE DRAWING

These and other objects and advantages of the present invention will become more apparent and more readily appreciated from the following detailed description of the presently preferred exemplary embodiment of the invention taken in conjunction with the accompanying drawing, of which:

FIG. 1 is a side elevational view of the presently preferred exemplary embodiment of this invention mounted on a vehicle;

FIG. 2 is a framentary perspective top plan view of the present invention;

FIG. 3 is a fragmentary top plan view of another embodiment of the present invention.

FIG. 4 is an elevational view of one side of the assembly of an adjustable bracket of the present invention with the cover in section interlockably engaged in the bracket;

FIG. 5 is another side view of the adjustable bracket in FIG. 4 of the present invention with an unfolding spring;

FIG. 6 is an exploded side view of the adjustable brackets holding the cover in a raised position off the surface of the vehicle of the present invention;

FIG. 7 is a fragmentary longitudinal sectional view through the roller container of the present invention.

DETAILED DESCRIPTION OF THE PRESENTLY PREFERRED EMBODIMENT

As illustrated in FIGS. 1, 3 and 7, rotatably attached to vehicle 200 is roller 202; and cover 214 is attached to roller 202, and may, for example, be made of vinyl. As best illustrated in FIGS. 2 and 3, cover 214 includes a main portion 218, and flaps 228. In fact, one end of main portion 218 is connected to roller 202, and the other end is attached to drawing lines 210. Flaps 228 are disposed at the sides of main portion 218. Gutter 230 is disposed across leading end of cover 214 for retaining foreign material from falling off to uncovered surface 238 (FIG. 6).

As best illustrated in FIGS. 1, 2, 3 and 6, guide means 212 are attached to the underside of cover 214. In the preferred embodiment, each of guide means 212 is slidably carrying interlockably attached to adjustable brackets 216 and wheels 240. The upper side of guide means 212 is attached to cover 214. Guide means 212 must be sufficiently flexible to allow cover 214 to bend, and in the preferred embodiment are plastic or canvas.

As best illustrated in FIG. 4, adjustable portion 220 of bracket 216 has larger portion 224 and thinner portion 222 both having corresponding holes and designed so that the length of adjustable portion 220 can be adjusted by slidably and securely attaching one portion to the other when the desired distance between adjustable bracket 216 and vehicle surface 238 is attained.

As illustrated in FIGS. 5 and 6, the larger portion 224 of adjustable portion 220 is hinged to base bracket 250 with hinge 252. Hinge 252 is spring loaded with spring 242 and clamped to surface 238 of vehicle 200. Spring 242 is biased outwardly so as to unfold the combination of hinge 252 and adjustable portion 220 to a standing position vertical to the surface 238.

As best illustrated in FIGS. 4 and 6, at the top end of thinner portion 220 of adjustable portion 220 is attached bracket 216. Brackets 216, in addition to guide rail and wheel 240 components has line holes 254 on one bracket and line holes 226 on another bracket.

As best illustrated in FIGS. 1 and 6, in the case of the cover 214 being retracted for storage at the rear of vehicle 200, line hole 254 is smaller than line hole 226. Lines 210 have knobs 234 and 236 spaced at distances which equal the distances between line holes 254 and 226. Knobs 234 is small enough to pass through line holes 226 but too big to pass through line holes 254; and knobs 236 are too big to pass through line holes 226. Plurality of brackets 216 with appropriate designs of line holes may be disposed in appropriate relationship to each other, depending on the object to be covered.

As illustrated in FIGS. 1, 2, 3, 4, and 6, lines 210 are attached to drawing means 232 at one end, and made to pass through line holes 226 on brackets 248, through which both line knobs 234 and 236 can pass. Lines 210 continue to pass through the remaining line holes on adjustable brackets 216, loop around pulleys 208 and connected to leading end of guides 212 or leading end of cover 214.

With this arrangement, as cover 214, for example, is retracted to uncover vehicle 200, guides 212 and lines 210 move in opposite directions. Thus knobs 234 and 236 catch on to line holes 254 and 226 respectively. As more pull is applied on drawing lines 210, springs 242 give due to pressures on brackets 216 by knobs 234 because the pressure exerted by the knobs is greater than the force of the springs. This causes adjustable brackets 216 with all the components to fold down to positions parallel to surface 238 of vehicle 200, as indicated by dotted arrows in FIG. 6. As cover 214 is extended out to cover vehicle 200, the action is reversed causing the guides 212 and lines 210 to move in reverse directions. During this second process, knobs 234 and 236 release the pressures on adjustable bracket portions 220 thus enabling springs 242 to unfold the wholelength of adjustable brackets 220 with section 216 at the top to positions vertical to surface 238 of vehicle 200. Adjustable brackets 216, in their vertical positions, raise cover 214 off the surface 238 of vehicle 200, thus providing a buffer between cover 214 and the top surface of vehicle 200. This enhances the cooling effect of the cover in the summer; minimizes the damaging effect of foreign material when it falls directly on the finish of the vehicle; and prevents cover 214 from scratching surface 238 as it is conveyed back and forth over the roof of the vehicle.

It is obviously possible therefore, to adjust the position and distance between cover 214 and flaps 228 in relation with the top and side surfaces 238 of vehicle 200. This preferred embodiment eliminates the problem of down grading the finish of the surface of the vehicle, or that of any object to be covered in this manner.

As illustrated in FIGS. 1 and 3, motor 246, electric or otherwise, may be disposed on any one of the bumpers of vehicle 200, or at an appropriate position to the object being covered, and engaged to drive the roller 202 and the drawing means 232 to activate the device. Push button switches and indicator lamps may be disposed on a dashboard of vehicle 200, or at any convenient position to facilitate automatic operation and control of the present invention. Limit switches may be built in to prevent any damage in the system.

As best illustrated in FIGS. 3 and 7, torsion springs 244 are built into roller 202 and drawing spools 232 in order to maintain proper tension in the system. Plurality of holes 249 are disposed at the bottom of storage house 204 in order to minimize accumulation of any liquid which may enter storage housing 204.

Although only a few exemplary embodiments of this invention have been described in detail above, those skilled in the art would readily appreciate that many modifications are possible in the exemplary embodiments without materially departing from the novel teachings and advantages of this invention. Accordingly, all such modifications are intended to be included within the scope of this application as defined in the following claims.

What is claimed is:

1. A motor vehicle and cover mechanism combination comprising a motor vehicle, a cover adapted to be moved from a stored position to an in-use position in generally spaced overlying relationship to at least an upper surface portion of said motor vehicle, means for moving said cover along a reciprocal path of travel in opposite predetermined directions between the in-use and stored positions, means responsive to movement of said cover in at least one of said predetermined directions for automatically raising said cover above said motor vehicle upper surface portion during movement of said cover therealong whereby contact/damage to the motor vehicle upper surface is precluded, said raising means including a plurality of support means carried by said motor vehicle for movement between a first position for holding said cover raised relative to said object upper surface portion and a second lowered covered position, means for pivotally mounting said support means for pivoting movement about an axis generally normal to said predetermined directions, and means for selectively adjusting the length of said plurality of support means to provide a selected one from a plurality of predetermined spacings between said cover and said upper surface portion.

2. The motor vehicle and cover mechanism combination as defined in claim 1 wherein said plurality of support means are movable between a position generally parallel to said predetermined direction of travel and a position generally normal thereto, and means for additionally selectively maintaining said support means between the latter-defined two positions.

3. A motor vehicle and cover mechanism combination comprising a motor vehicle,
    a cover adapted to be moved from a stored position to an inuse position in generally overlying relationship to at least an upper surface portion of said motor vehicle,
    means for storing said cover in roll form in its stored position supported by one end of said motor vehicle,
    means for moving said cover into different and opposite directions from said stored position to said in-use position and vice versa along a path of travel lengthwise of said motor vehicle,
    means for guiding said cover for sliding movement across said motor vehicle upper surface portion,
    means responsive to movement of said cover in at least one of said two directions for automatically raising said cover above said motor vehicle upper surface portion during movement of said cover therealong whereby contact/damage to the motor vehicle upper surface portion is precluded,
    said raising means including a plurality of support means carried by said motor vehicle for pivotal movement between a first position for holding said cover raised relative to said motor vehicle upper surface portion and a second lowered cover position about axes transverse to said path of travel, and
    means for selectively adjusting the length of said plurality of support means to provide a selected one from a plurality of predetermined spacings between said cover and said motor vehicle upper surface portion.

4. The motor vehicle and cover mechanism combination as defined in claim 3 wherein said automatic raising means are operative for also automatically permitting movement of said support means to the second position thereof upon movement of said cover toward its stored position.

5. The motor vehicle and cover mechanism combination as defined in claim 3 wherein
said cover moving means includes a flexible element having a pair of runs and a bight therebetween,
said bight being positioned opposite to said cover storing means,
and said moving means including means for moving said runs in opposite directions to cause movement of said cover in each of the two different and opposite directions of movement thereof.

6. The motor vehicle and cover mechanism combination as defined in claim 3 wherein
said cover moving means includes a flexible element cooperative with said support means,
means for maintaining said support means in said first raised position thereof,
and means carried by said flexible element for effecting movement of said support means from said first raised position to said second lowered cover position upon movement of said cover to the stored position thereof.

7. The motor vehicle and cover mechanism combination as defined in claim 1 wherein
said cover moving means includes a flexible element cooperative with said support means,
means for maintaining said support means in the first position thereof,
means carried by said flexible element for moving said support means from said first position to said second position upon movement of said cover to the stored position thereof,
and said support means moving means including abutment means carried by said flexible element for abuttingly contacting said support means.

8. The motor vehicle and cover mechanism combination as defined in claim 3 wherein
said cover moving means includes a flexible element cooperative with said support means,
means for maintaining said support means in the first position thereof,
means carried by said flexible element for moving said support means from said first position to said second position upon movement of said cover to the stored position thereof,
said support means including opening means through which passes said flexible element,
and said support means moving means includes abutment means carried by said flexible element of a size greater than said opening means for abuttingly contacting said support means.

9. The motor vehicle and cover mechanism combination as defined in claim 3 wherein
said cover is generally elongated and includes opposite transverse ends and opposite lateral edge portions,
and opposite transversely directed lateral flaps project beyond said lateral edge portions for overhanging and protecting sides of an associated covered object.

10. The motor vehicle and cover mechanism combination as defined in claim 3 including roller means at an opposite end of the motor vehicle from said cover storing means, means for supporting said cover in rolled-up condition in said cover storing means, said cover moving means including a flexible element connected to a leading end of said cover, said flexible element having a bight portion entrained about said roller means, said moving means being effective for rolling and unrolling said cover through said flexible element, said flexible element passing through opening means in said raising means, and guide means between said raising means and said cover for guiding the movement of said cover between the stored and in-use positions thereof.

11. The motor vehicle and cover mechanism combination as defined in claim 10 including means for normally biasing said cover support means to the second position thereof.

12. The motor vehicle and cover mechanism combination as defined in claim 3 including a roller in said storing means upon which said cover is rolled, means for tensioning said cover at least in its in-use position, and means for controlling the tension of said tensioning means.

13. A cover mechanism for an object such as a vehicle, a sports field, a swimming pool, a product drying surface, a nursery plot or a vegetable plant plot, an aircraft, a ship or the like comprising
a cover adapted to be moved from a stored position to an inuse position in generally overlying relationship to at least an upper surface portion of an associated underlying object,
means for storing said cover in roll form in its stored position supported by one end of said associated object,
means for moving said cover into different and opposite directions from said stored position to said in-use position and vice versa,
means for guiding said cover for sliding movement across said object upper surface portion,
means responsive to movement of said cover in at least one of said two directions for automatically raising said cover above said object upper surface portion during movement of said cover therealong whereby contact/damage to the object upper surface portion is precluded,
said raising means including a plurality of support means carried by said object for movement between a first position for holding said cover raised relative to said object upper surface portion and a second lowered cover position,
means for selectively adjusting the length of said plurality of support means to provide any desired air space between said cover and said object upper surface portion, and
said storing means being a housing, and said housing including a plurality of drainage holes for draining liquid therefrom.

14. A cover mechanism for an object such as a vehicle, a sports field, a swimming pool, a product drying surface, a nursery plot or a vegetable plant plot, an aircraft, a ship or the like comprising
a cover adapted to be moved from a stored position to an inuse position in generally overlying relationship to at least an upper surface portion of an associated underlying object,
means for moving said cover into different and opposite directions from said stored position to said in-use position and vice versa,
means responsive to movement of said cover in at least one of said two directions for automatically raising said cover above said object upper surface portion during movement of said cover therealong whereby contact/damage to the object upper surface portion is precluded, and
said cover includes an upwardly opening transversely disposed generally U-shaped gutter portion along a leading end of said cover for collecting material thereby preventing such material from falling upon uncovered surface portions of the associated object.

15. The cover mechanism as defined in claim 14 wherein said cover is generally elongated and includes opposite transverse ends and opposite lateral edge portions, and opposite transversely directed lateral flaps project beyond said lateral edge portions for overhanging and protecting sides of an associated covered object.

16. A motor vehicle and cover mechanism combination comprising a motor vehicle, a cover adapted to be moved from a stored position to an in-use position in generally overlying relationship to at least an upper surface portion of said motor vehicle, means for storing said cover in roll form in its stored position supported by one end of said motor vehicle, means for moving said cover into different and opposite direction from said stored position to said in-use position and vice versa along a path of travel lengthwise of said motor vehicle, means for guiding said cover for sliding movement across said motor vehicle upper surface portion, means responsive to movement of said cover in at least one of said two directions for automatically raising said cover above said motor vehicle upper surface portion during movement of said cover therealong whereby contact-/damage to the motor vehicle upper surface portion is precluded, said raising means including a plurality of support means carried by said motor vehicle for pivotal movement between the first position for holding said cover raised relative to said motor vehicle upper surface portion and a second lowered cover position about axes transverse to said path of travel, means for selectively adjusting the length of said plurality of support means to provide a selected one from a plurality of predetermined spacings between said cover and said motor vehicle upper surface portion, said automatic raising means being operative for also automatically permitting movement of said support means to the second position thereof upon movement of said cover toward its stored position, said cover moving means including a flexible element having a pair of runs and a bight therebetween, said bight being positioned opposite to said cover storing means, said moving means including means for moving said runs in opposite directions to cause movement of said cover in each of the two different and opposite directions of movement thereof, roller means at an opposite end of the motor vehicle from said cover storing means, said flexible element having a bight portion entrained about said roller means, said moving means being effective for rolling and unrolling said cover through said flexible element, said flexible element passing through opening means in said raising means, and guide means between said raising means and said cover for guiding the movement of said cover between the stored and in-use positions thereof.

* * * * *